Patented Aug. 30, 1938

2,128,880

UNITED STATES PATENT OFFICE 2,128,880

COMPOSITION CORK

Kenneth M. Irey and Lawrence M. Debing, Palisades Park, N. J., assignors to Resinox Corporation, New York, N. Y., a corporation of Delaware No Drawing. Application November 14, 1935, Serial No. 49,734

6 Claims. (Cl. 106—22)

Our invention relates to the production of composition cork. More specifically, our invention relates to the production of an improved composition cork particularly adapted for use in food containers.

Numerous bonding materials have been recommended in the past for use in the production of composition cork, but most of these have had serious disadvantages, particularly for uses such as liners for bottle caps and the like. Gelatin and animal glues have been most widely used for such purposes, but these materials have the disadvantage of readily supporting mold growth and the further disadvantage of not being completely water impervious, thus giving rise to discoloration due to moisture penetrating to the metal cap. These disadvantages have necessitated the use of a thin layer of foil of a non-corrosive metal applied over the cork liner. Various other bonding materials have been recommended to avoid this objection but most of these have been disadvantageous from the standpoints of taste, odor, lack of flexibility and the like. The resinous binders suggested in the past have also had the serious disadvantage of containing substantial quantities of free phenols.

We have now discovered that the advantages of both the gelatin type binders and the phenolic resin binders may be obtained by utilizing as the bonding agent a resinous impregnating material having as a base a condensation product of an aldehyde with a bis-[hydroxy-aryl]-dimethyl methane and/or a bis-[hydroxy-aryl]-dimethyl methane—ketone condensation product. Materials of this type may be applied to comminuted cork in much the same manner as gelatin or other previously used bonding agents and the same general procedure for preparing the composition cork and articles therefrom may be employed.

Resinous impregnating agents of the type utilized in the present invention are disclosed in copending U. S. patent application Ser. No. 49,733 by K. M. Irey and L. M. Debing, filed Nov. 14, 1935. As disclosed therein the preferred form of impregnating material constitutes a suspension of a heat reactive condensation product of an aldehyde with a mixture of a bis-[hydroxy-aryl]-di-alkyl methane and a bis-[hydroxy-aryl]-di-alkyl methane—ketone condensation product in a high boiling solvent, or plasticizer. The following example illustrated a suitable procedure for preparing a material of this nature.

Beta.beta-bis-[4 - hydroxy-phenyl]-propane is prepared by any known procedure, as for example, by the method described by W. A. Beatty in U. S. Patent No. 1,225,748 granted March 15, 1917. The product thus obtained is a white crystalline material having a melting point of 150 to 154° C. Beta.beta-bis-[4 - hydroxy - phenyl] - propane—acetone condensation product is prepared by reacting the above described crystalline material with acetone, or by any other suitable procedure, as for example, by the method disclosed in co-pending application U. S. Ser. No. 680,230 by K. M. Irey and L. C. Swallen. This condensation product is a reddish colored resinous material having a melting point around 50° C. The mixed intermediate which we prefer to employ in the present process comprises approximately equal proportions of the beta.beta-bis-[4-hydroxy-phenyl]-propane and the beta.beta-bis-[4-hydroxy-phenyl]-propane—acetone condensation product obtained as above described. This mixture may be obtained simply by mixing the two materials, or the mixture may be obtained in a single reaction of the corresponding hydroxy-aryl compound and ketone in accordance with the process described in copending application Ser. No. 680,230 referred to above.

The mixed intermediate is next reacted with formaldehyde in the presence of an alkaline catalyst. The degree of reaction obtained is determined by the "dry rubber" test in which a sample of the material is tested on a hot plate at 150° C. to determine the length of time necessary to eliminate tackiness. This stage of the reaction may be carried out as follows: 100 parts of the mixed intermediate product described above are placed in a resin kettle, melted and then cooled to approximately 60° C. The mass is then thoroughly mixed with 70 parts of a 40% formaldehyde solution after which 4 parts of barium hydroxide and one part of lime are added in the form of aqueous suspensions. The resulting mixture is then reacted under heat until a sample exhibits a dry rubber test of approximately 15 to 25 seconds. When this point is reached, the application of heat is immediately stopped and the plasticizer, e. g., diethylene glycol, is added as quickly as possible. The amount of plasticizer to be added will depend upon the desired plasticity of the impregnating material, but for most purposes should be just sufficient to bring the material to the state of a thin liquid having a dry rubber test of approximately 40 seconds.

Other suitable impregnating materials may be prepared from equivalent reactants and the reaction conditions may, of course, be varied somewhat depending upon the exact nature of the product desired. In most cases, however, we have found that a material having a dry rubber test of approximately 40 seconds prepared from a condensation product having a dry rubber test of 15 to 25 seconds is eminently suitable for the production of composition cork for cap liners. The plasticizer utilized in the composition does not enter into chemical reaction with the resinous ingredients and, therefore, may comprise any suitable high boiling solvent or plasticizer for the condensation product which imparts the desired degree of flexibility to the finished product. The amount required may vary somewhat depending upon the degree of comminution of the cork employed and upon the degree of flexibility desired, but, in general, should be sufficient to give a thin liquid resin of a consistency similar to that of the 40 second solution described above.

In applying impregnating agents of the above type to comminuted cork, the usual procedures utilized for gelatin or other bonding agents may be employed with suitable modification as to the time and temperature required to transform the resinous impregnating agent into the insoluble state. The following represents one suitable procedure which may be employed: 100 parts of ground cork and 20 parts of the resinous impregnating agent obtained in the example above are thoroughly mixed until the resulting mass is dry to the touch and has no tendency to stick or lump together. The processed cork is then formed into suitable shapes for curing. In the case of the production of bottle cap liners, the cork may suitably be tamped into metal cylinders of the desired diameter, thus forming rods which may be later sliced into cap liners. The filled cylinders or other suitable forms are heat treated to effect the cure of the binder. This may be accomplished in any suitable oven of the type generally employed for this purpose. In the case of one inch rods, a cure of approximately 19 minutes at 375° F. will be found to be satisfactory with corresponding times for other thicknesses of material. The optimum cure may vary somewhat depending on the particular compounds employed in producing the resinous binder, but the above time and temperature will generally be found to be satisfactory. As will be evident to those skilled in the art, the time and temperature of cure may be varied by utilizing a lower temperature for a longer time, or a higher temperature for a shorter time. The time and temperature should be sufficient to give a full cure without any possibility of burning the cork. In any case preliminary tests will readily determine the optimum cure for a particular binder or a particular size and shape of material.

After the cure is completed the forms should preferably be cooled quickly, for example, by means of a blast of cold air. The rods or other forms are then removed from the molds and are ready for cutting into the desired final form. In the case of one inch rods formed as above described, it will be found that the material possesses adequate flexibility for use as cap liners and yet may readily be cut into discs ⅛ inch thick or less.

The composition cork prepared as above described will be found to have numerous advantages over previously employed materials. It is completely water impervious and may be used as a cork liner for beverage bottle caps without any discoloration and, therefore, without the necessity for using foil "spots". The material does not support mold growth, is tasteless and odorless, and imparts no undesirable properties whatever to beverages or foodstuffs. The material has adequate flexibility and remains flexible even after standing for long periods in a dry state. These and other advantages, therefore, make the present material especially suited for use as bottle cap liners.

It is to be understood, of course, that our invention is not to be limited to the particular examples given above by way of illustration. Equivalent reactants and varying proportions or reaction conditions may be employed depending upon the exact nature of the product desired. For example, instead of employing beta.beta-bis-[4-hydroxy-phenyl]-propane and its acetone condensation product, any of of the homologues of these materials could be employed. Also, in place of formaldehyde, its polymers such as para-formaldehyde or hexamethylene-tetramine, or its homologues such as acetaldehyde could be utilized. Likewise, any suitable high boiling solvent or plasticizer, such as glycerine, which is compatible with the resinous reaction product and the water contained in such product, and which is chemically inactive at the temperatures employed, could suitably be substituted for the diethylene glycol specified in the example. In general it may be stated that any equivalents or modifications of procedure which would naturally occur to one skilled in the art are included within the scope of our invention.

Our invention now having been described what we claim is:

1. A process for the producton of composition cork which comprises mixing comminuted cork with a resinous binder prepared by heat reacting a mixture of a bis-[hydroxy-aryl]-di-alkyl methane and a bis-[hydroxy-aryl]-di-alkyl methane—ketone condensation product with a sufficient proportion of an aldehyde to form an insoluble infusible product when fully reacted, carrying the reaction to an advanced stage evidenced by a dry rubber test of 15 to 25 seconds, and then immediately preventing substantial further reaction by ceasing the application of heat and introducing a plasticizer compatible with the condensation product thus produced, and subjecting the mixture of comminuted cork and resinous binder to the action of heat to transform said resinous binder to the insoluble state.

2. A process for the production of composition cork which comprises mixing comminuted cork with a resinous binder prepared by heat reacting a mixture of beta.beta-bis-[4-hydroxy-phenyl]-propane and beta.beta-bis-[4-hydroxy-phenyl]-propane—acetone condensation product with a sufficient proportion of formaldehyde to form an insoluble infusible product when fully reacted, carrying the reaction to an advanced stage evidenced by a dry rubber test of 15 to 25 seconds, and then immediately preventing substantial further reaction by ceasing the application of heat and introducing a plasticizer compatible with the condensation product thus produced, and subjecting the mixture of comminuted cork and resinous binder to the action of heat to transform said resinous binder to the insoluble state.

3. A process for the production of composition cork which comprises mixing comminuted cork with a resinous binder prepared by heat reacting a mixture of beta.beta-bis-[4-hydroxy-phenyl]-propane and beta.beta-bis-[4-hydroxy-phenyl]-propane—acetone condensation product with a sufficient proportion of formaldehyde to form an insoluble infusible product when fully reacted, carrying the reaction to an advanced stage evidenced by a dry rubber test of 15 to 25 seconds, and then immediately preventing substantial further reaction by ceasing the application of heat and introducing diethylene glycol into the condensation product thus produced in an amount sufficient to increase the dry rubber test of the final product to approximately 40 seconds, and subjecting the resulting mixture of comminuted cork and resinous binder to the action of heat to transform said resinous binder to the insoluble state.

4. A molding composition for the production of composition cork comprising comminuted cork and a resinous binder prepared by heat reacting a mixture of a bis-[hydroxy-aryl]-di-alkyl methane and a bis-[hydroxy-aryl]-di-alkyl methane—ketone condensation product with a sufficient proportion of an aldehyde to form an insoluble infusible product when fully reacted, carrying the reaction to an advanced stage evidenced by a dry rubber test of 15 to 25 seconds, and then immediately preventing substantial further reaction by ceasing the application of heat and introducing a plasticizer compatible with the condensation product thus produced.

5. A molding composition for the production of composition cork comprising comminuted cork and a resinous binder prepared by heat reacting a mixture of beta.beta-bis-[4-hydroxy-phenyl]-propane and beta.beta-bis-[4-hydroxy-phenyl]-propane—acetone condensation product with a sufficient proportion of formaldehyde to form an insoluble infusible product when fully reacted, carrying the reaction to an advanced stage evidenced by a dry rubber test of 15 to 25 seconds, and then immediately preventing substantial further reaction by ceasing the application of heat and introducing a plasticizer compatible with the condensation product thus produced.

6. A molding composition for the production of composition cork comprising comminuted cork and a resinous binder prepared by heat reacting a mixture of beta.beta-bis-[4-hydroxy-phenyl]-propane and beta.beta-bis-[4-hydroxy-phenyl]-propane—acetone condensation product with a sufficient proportion of formaldehyde to form an insoluble infusible product when fully reacted, carrying the reaction to an advanced stage evidenced by a dry rubber test of 15 to 25 seconds, and then immediately preventing substantial further reaction by ceasing the application of heat and introducing diethylene glycol into the condensation product thus produced in an amount sufficient to increase the dry rubber test of the final product to approximately 40 seconds.

KENNETH M. IREY.
LAWRENCE M. DEBING.